United States Patent [19]
Ishikawa et al.

[11] Patent Number: 5,191,347
[45] Date of Patent: Mar. 2, 1993

[54] PULSED DOPPLER RADAR SYSTEM

[75] Inventors: Sachiko Ishikawa; Takahiko Fujisaka; Yoshimasa Oh-hashi, all of Kanagawa, Japan

[73] Assignee: Mitsubishi Denki Kabushiki Kaisha, Japan

[21] Appl. No.: 751,126

[22] Filed: Aug. 28, 1991

[30] Foreign Application Priority Data

Aug. 30, 1990 [JP] Japan .................................. 2-229234

[51] Int. Cl.$^5$ ............................................. G01S 13/53
[52] U.S. Cl. ..................... 342/132; 342/108; 342/115; 342/99; 342/196
[58] Field of Search ................. 342/132, 108, 115, 99, 342/196

[56] References Cited

U.S. PATENT DOCUMENTS

| | | | |
|---|---|---|---|
| 3,745,571 | 7/1973 | Chwastyk et al. | 342/194 |
| 4,003,054 | 1/1977 | Goldstone | 342/174 |
| 4,042,925 | 8/1977 | Albanese et al. | 342/132 |
| 4,876,547 | 10/1989 | Franco | 342/160 |
| 4,914,441 | 4/1990 | Brookner | 342/161 |

Primary Examiner—John B. Sotomayor
Attorney, Agent, or Firm—Wolf, Greenfield & Sacks

[57] ABSTRACT

A pulsed Doppler radar system comprises a transmitter for generating and transmitting a pulse signal having expanded frequency bandwidth, an antenna apparatus for sending the output of the transmitter to a target and for receiving a signal which was sent by the transmitter and reflected by the target, a receiver for processing the received signal to obtain a complex video signal, a pulse compressing circuit including a pulse Doppler processor responsive to the complex video signal for detecting a relative speed of the target and a storage device for storing a reference signal which includes a compensation factor by which an influence of the Doppler effect is compensated in accordance with the speed of the target. The pulse compressing circuit is operative to correlate the output of the pulse Doppler processor with the reference signal so as to convert the complex video signal to a signal having a narrow pulse width, a detector for performing envelope detection on the narrow pulse width signal, and a display responsive to the output of the detector for displaying a detected target thereon.

8 Claims, 11 Drawing Sheets

TRANSMITTED PULSE (c)

PRIOR ART

Fig. 8

PRIOR ART

PULSED DOPPLER RADAR SYSTEM

BACKGROUND OF THE INVENTION

1. Field of the Invention

The present invention relates to a pulsed Doppler radar system for detecting a target moving at a high speed.

2. Description of the Prior Art

Figure 1:
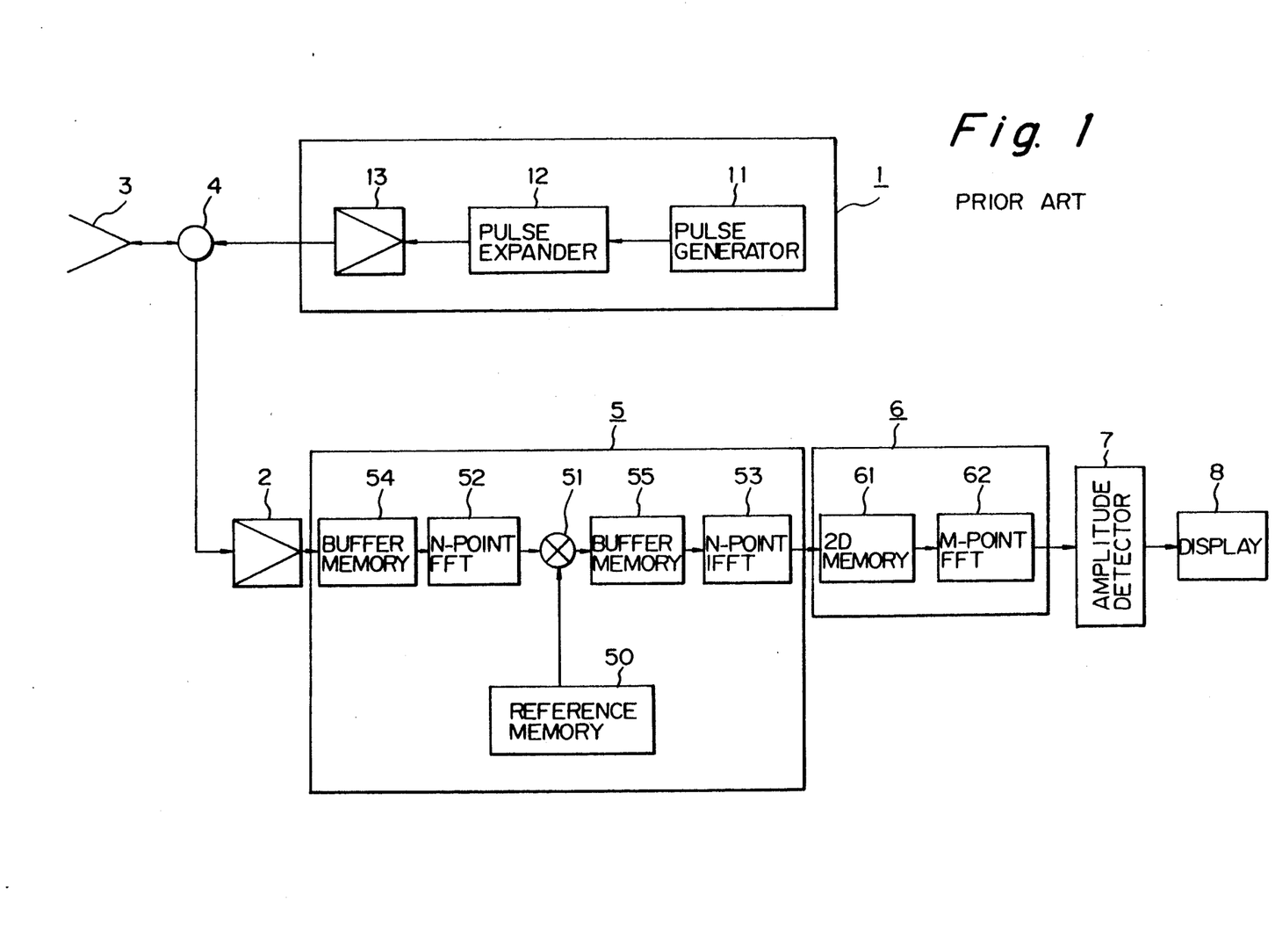
FIG. 1 is a block diagram showing the construction of a chirp-type pulsed Doppler radar system of the prior art.
Figure 2:
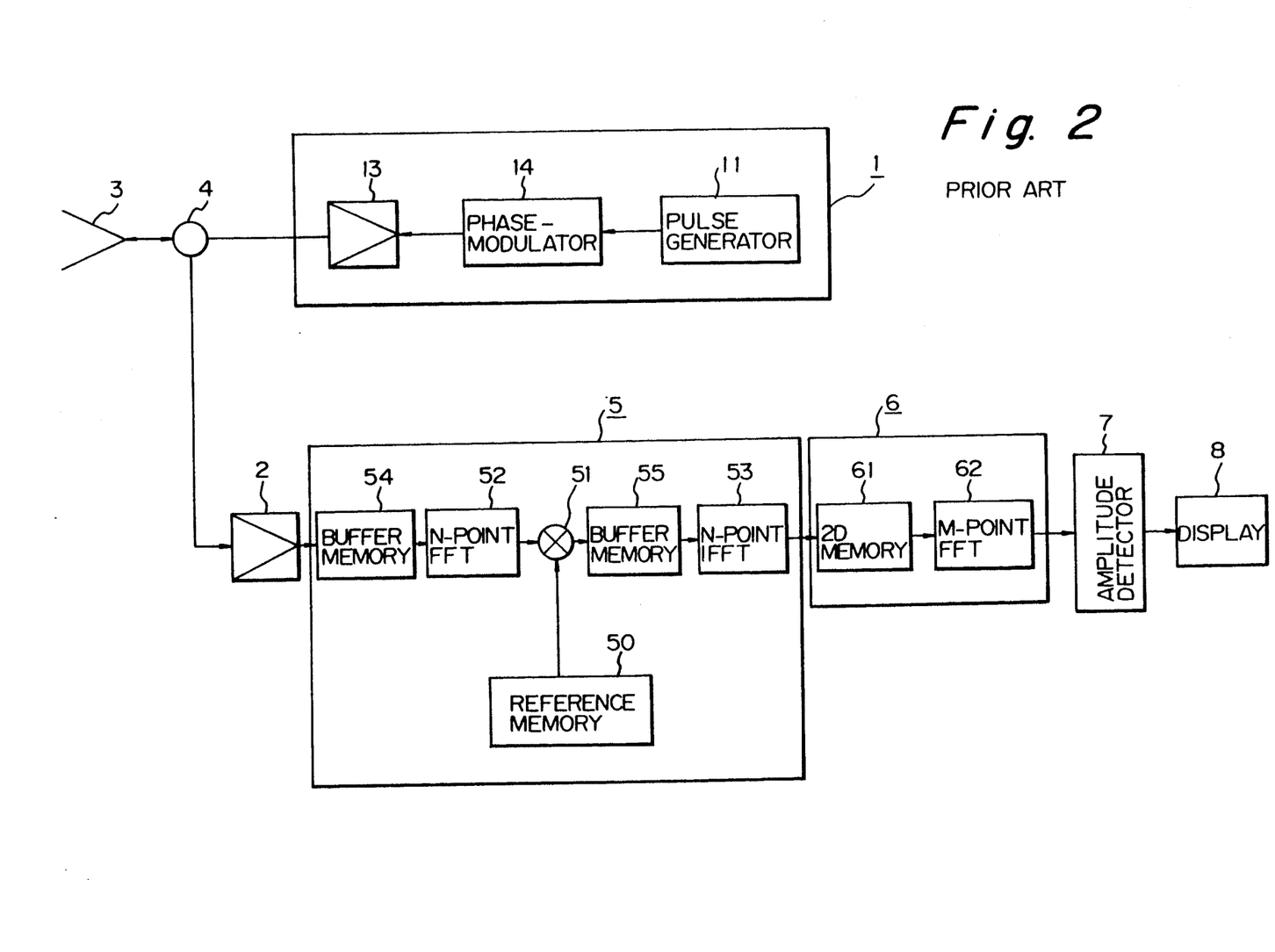
FIG. 2 is a block diagram showing the construction of a code modulation-type pulsed Doppler radar system of the prior art.

Pulsed Doppler radar systems are widely used for searching and tracking targets. FIGS. 1 and 2 schematically show the construction of known chirp-type and code modulation-type pulsed Doppler radar systems, respectively. Each of the pulsed Doppler radar systems shown in these figures generally comprises a transmitter 1, a receiver 2, an antenna 3, a T/R switch 4, a pulse compressing unit 5, a pulse doppler processing unit 6, an amplitude detector 7 and a display 8.

Figure 4:
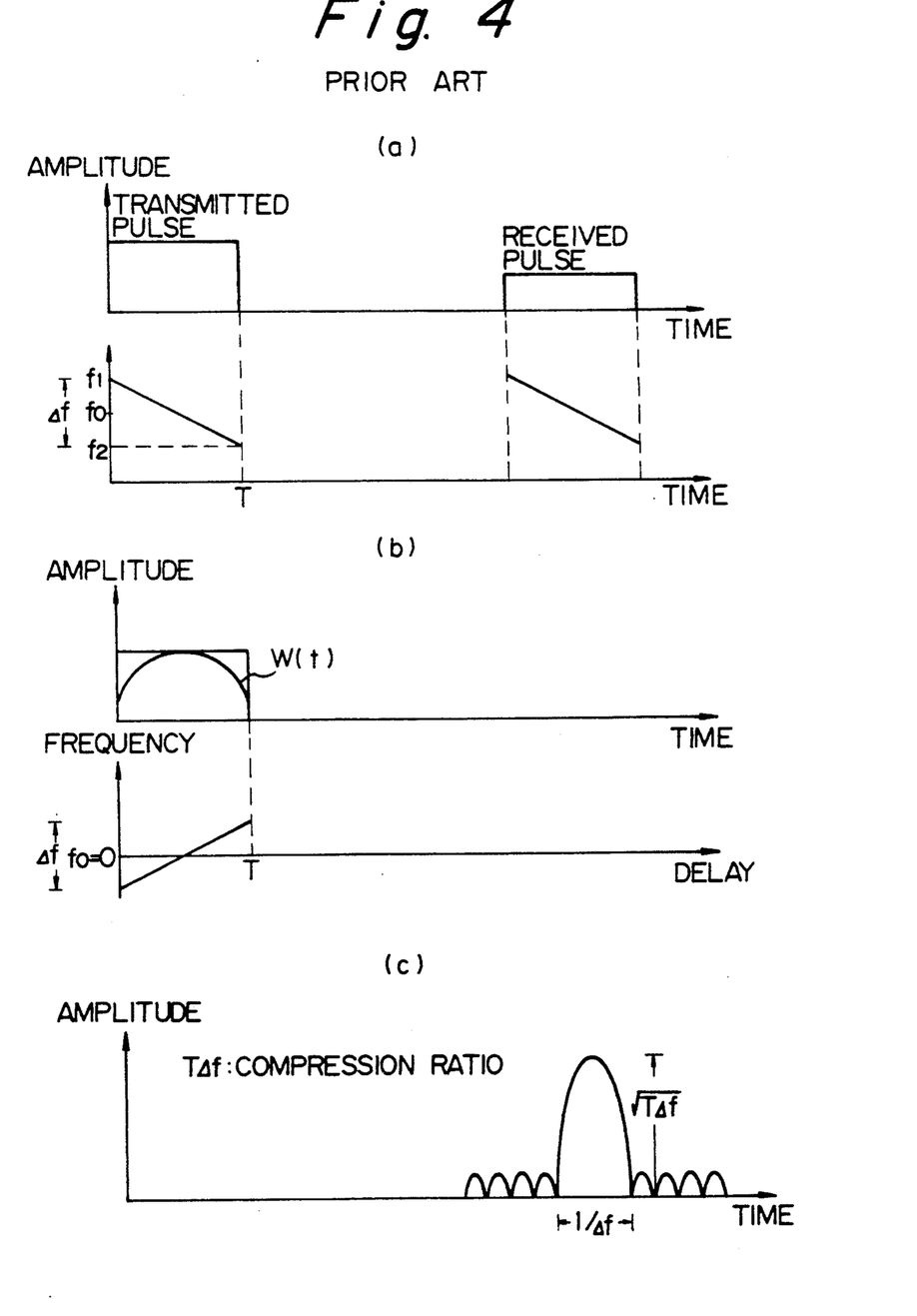
FIGS. 4a, 4b and 4c exemplarily show transmitted and received pulses, a reference signal and the waveform of a compressed pulse, respectively, of the chirp system of the prior art.
Figure 5:
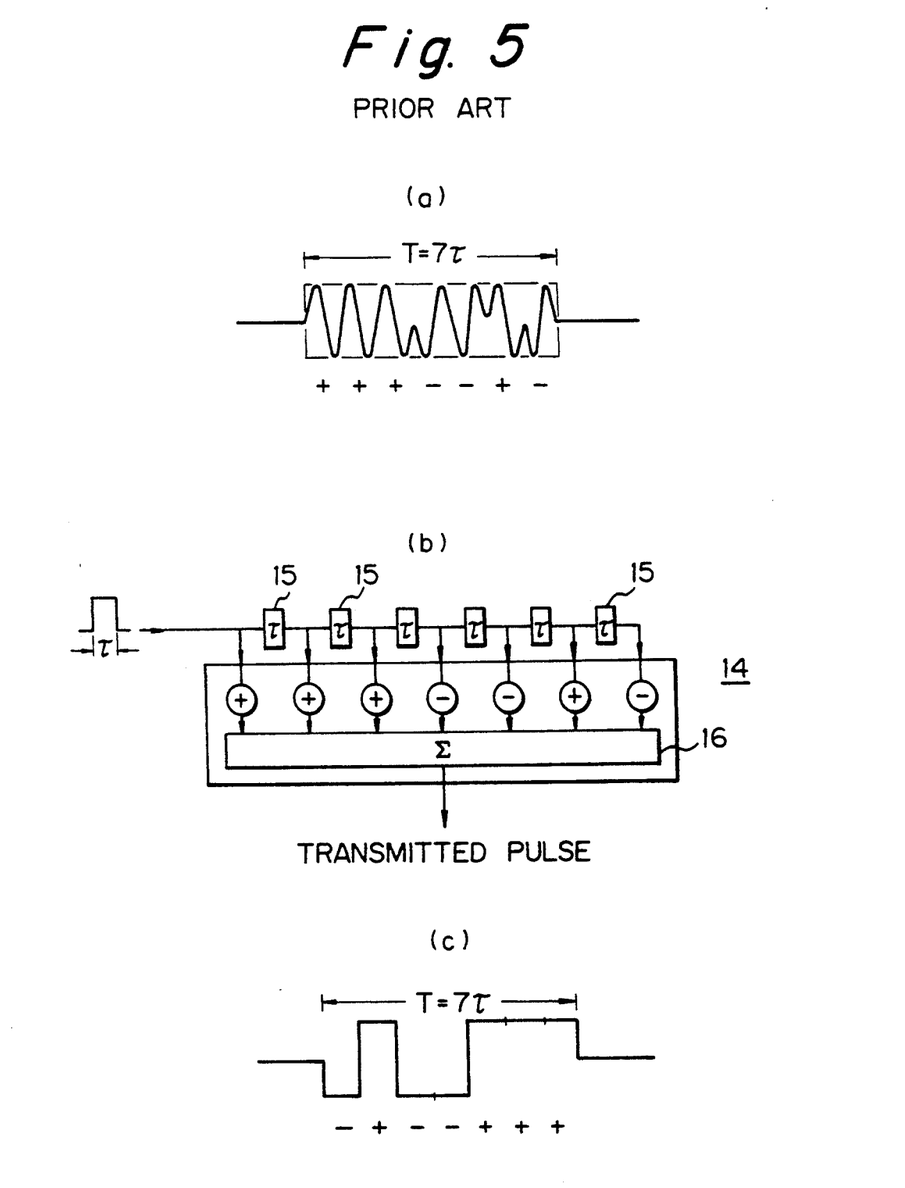
FIGS. 5a, 5b and 5c exemplarily shown the waveform of a transmitted pulse, the construction of a phase-modulator and the waveform of a reference signal, respectively, of the code modulation system of the prior art.

In FIG. 1, a transmission pulse having a pulse width $\tau$ is generated by a pulse generator 11 in the transmitter 1 and expanded by a pulse expander 12 to a chirp (linearly frequency-modulated) pulse having a pulse width T ($T > \tau$) and a frequency band $\Delta f$ ($=1/\tau$) shown in FIG. 4a. In the meantime, in the radar system shown in FIG. 2, the pulse generator 11 in the transmitter 1 generates a transmission pulse having a pulse width $\tau$. In the case of phase-modulation by a seven-bit Barker code, the generated pulse is converted to a phase-coded pulse having a pulse width T (FIG. 5a) by a phase-modulator 14 comprising delay elements 15 and an adder 16 shown in FIG. 5b.

The modulated transmission pulses produced in the chirp-type radar system as shown in FIG. 1 and the pulse modulation-type radar system as shown in FIG. 2 have extended frequency bands and pass through the T/R switches 4 and the antennas 3 to be emitted to targets. The transmitted waves are reflected by the targets and received by the antennas 3. The received signals pass through the T/R switches 4 and are supplied to the receivers 2 where the received signals are converted to complex digital video signals.

Figure 3:
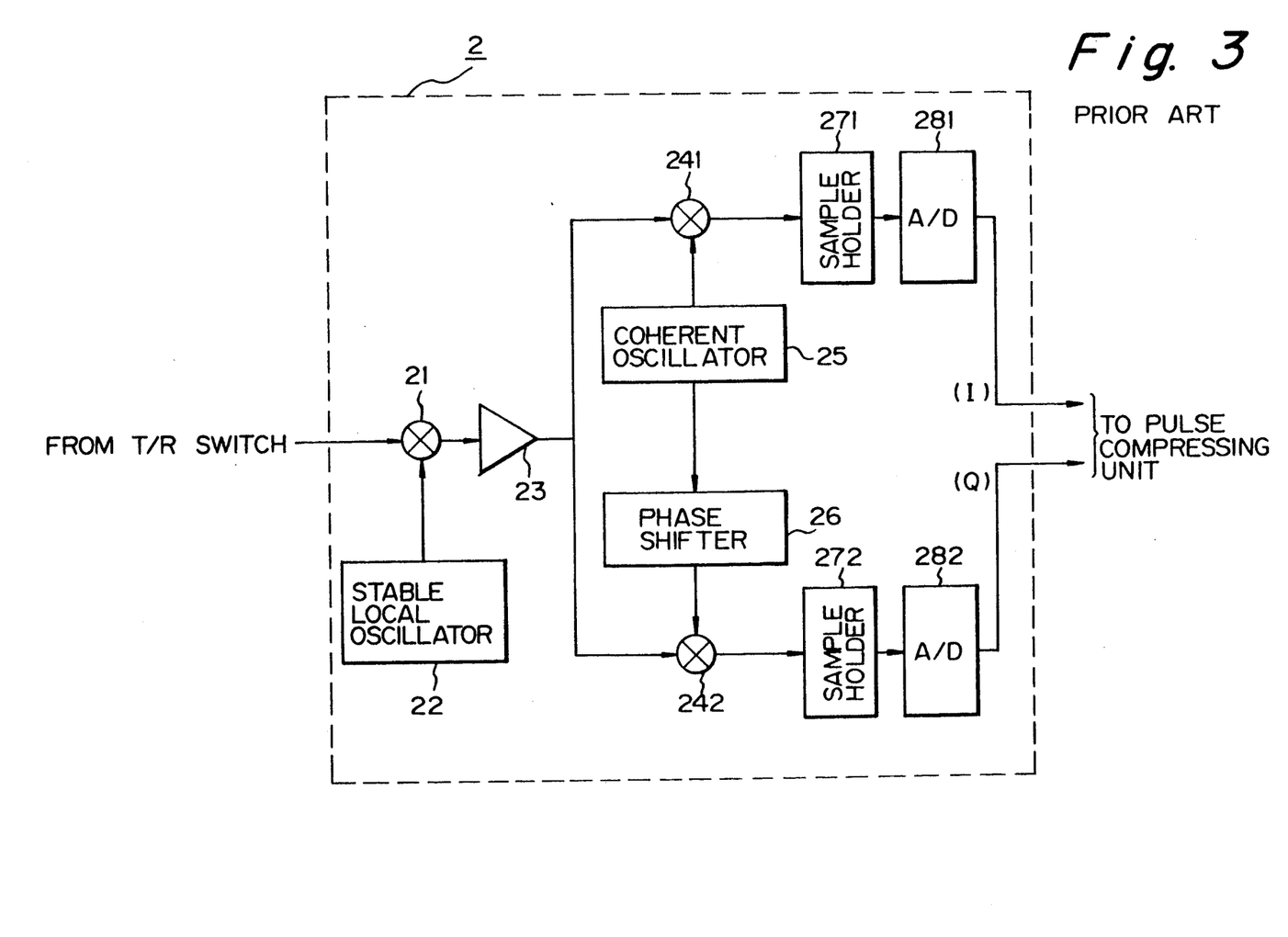
FIG. 3 is a block diagram showing the construction of a receiver employed in the systems shown in FIGS. 1 and 2.

FIG. 3 shows an example of the construction of the receiver 2. A signal received by the antenna 3 is fed through the T/R switch 4 to a mixer 21 where the received signal is multiplied by the output of a stable local oscillator (STALO) 22 and converted to an IF (intermediate frequency) signal. The IF signal is amplified by an IF amplifier 23 and divided to two. One of the divided IF signals is supplied to a first phase-sensitive detector 241 and multiplied by the output of a coherent oscillator 25 to be phase-detected. The output of the coherent oscillator 25 is also supplied through a 90-degree phase shifter 26 to be delayed by 90°. The 90-degree delayed signal is fed to a second phase-sensitive detector 242 and multiplied by the other of the divided IF signals to be phase-detected. The outputs of the respective phase-sensitive detectors 241 and 242 indicate real and imaginary parts, respectively, of a received complex video signal and stored in corresponding sample holders 271 and 272 and converted by analog-to-digital converters 281 and 282 to form a digital complex video signal to be fed to the pulse compressing unit 5.

Next, operations of the pulse compressing unit 5 and the pulse Doppler processing unit 6 in each of the radar systems will be explained with reference to FIGS. 1 through 8. A reference memory 50 (FIGS. 1 and 2) in the pulse compressing unit 5 has already stored a reference signal. Assuming that the modulated transmission pulse generated by the transmitter 1 (shown in FIG. 4a in the case of the chirp-type system or in FIG. 5b in the case of the code modulation-type system) is represented as TR(t), the reference signal RF(t) shown in FIG. 4b in the case of the chirp-type system or in FIG. 5c in the case of the code modulation system is expressed in the following:

$$RF(t) = TR(T-t) \times exp(-2\pi f_0 t) \quad (0 \leq t \leq T)$$

$$RF(t) = 0 \quad (T < t)$$

where T denotes the width of a transmission pulse and $f_0$ denotes a carrier wave frequency. If an amplification charcteristic for a received signal is indicated by w(t) shown in FIG. 4b, the reference signal is expressed as follows:

$$RFw(t) = RF(t) \times w(t)$$

The reference signal RFw(t) is a function of time t, and can be considered to be equivalent to a function R(r) of a range bin r (=t/ts) where ts indicates a sampling interval. When this function R(r) is Fourier-transformed in the direction of range, a spectrum of the reference signal Rr(fr) expressed in the following is obtained:

$$Rr(fr) = Fr[R(r)]$$

where Fr indicates a Fourier-transform in the direction of range. The spectrum Rr(fr) of the reference signal is prestored in the reference memory 50. It should be noted that the spectrum Rr(fr) is produced in the same manner in both chirp-type and code modulation-type systems.

Figure 6:
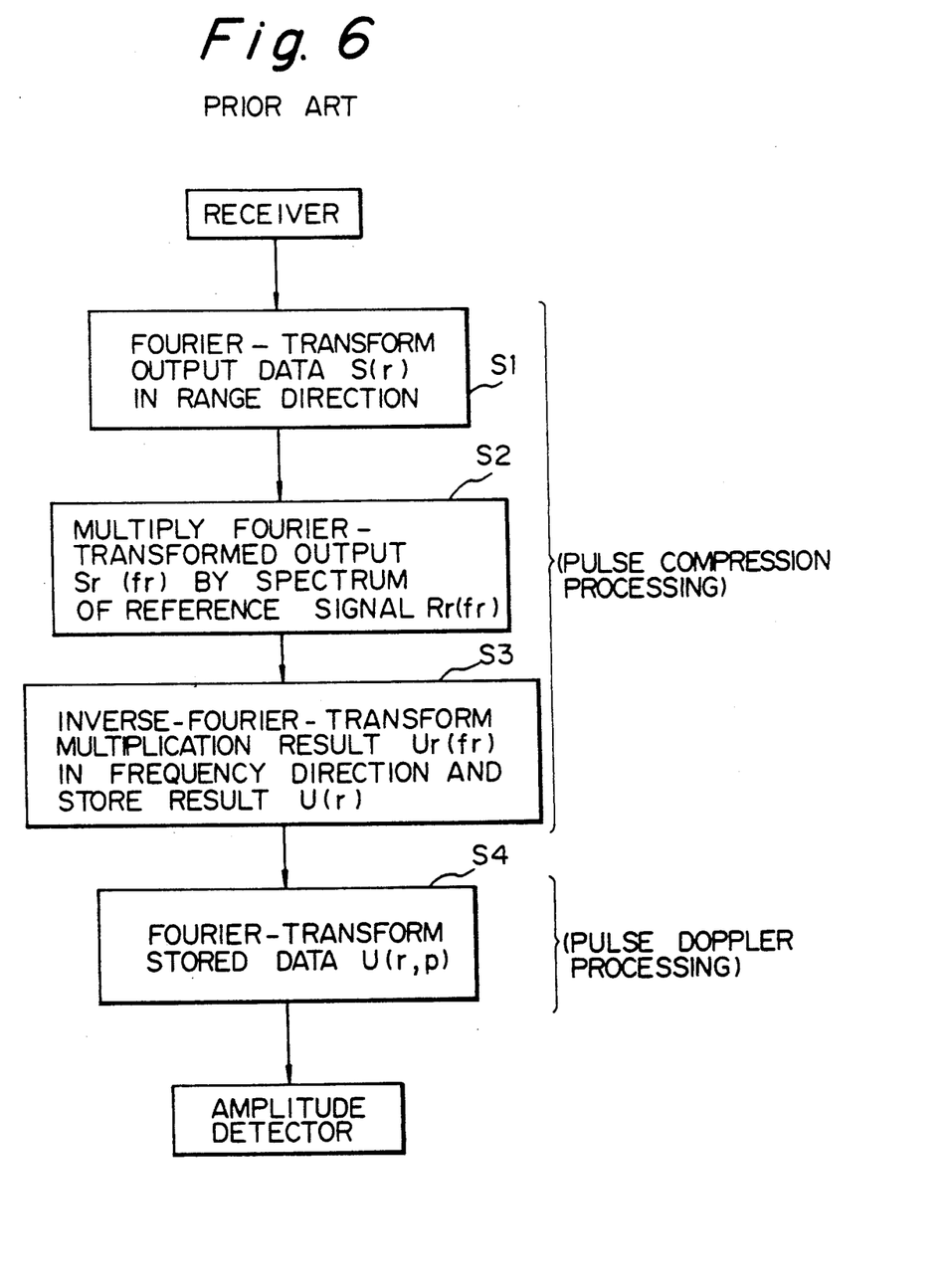
FIG. 6 shows a flowchart of signal processing in a pulse compressing unit and a pulse Doppler processing unit.
Figure 7:
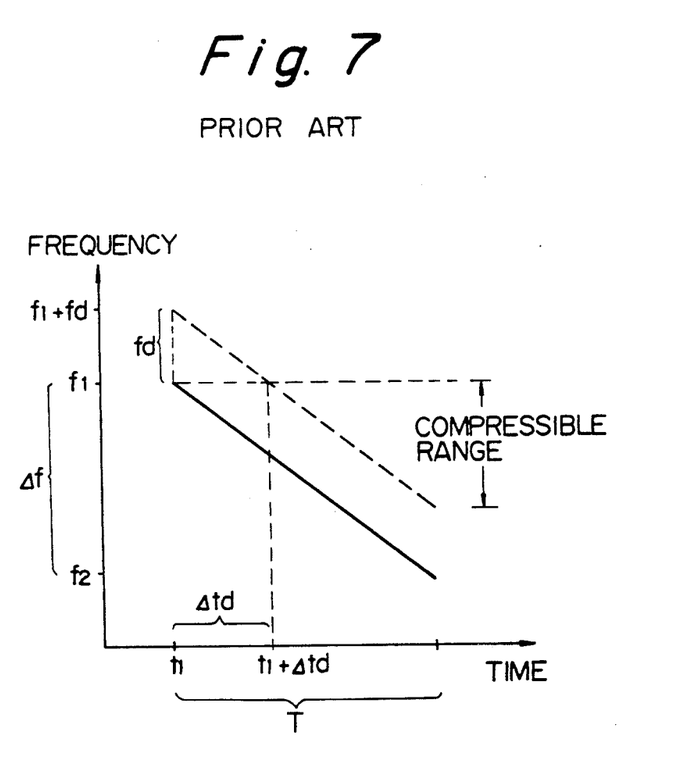
FIG. 7 shows pulse compression characteristics of the chirp system for explaining an influence of Doppler shift to the system.

Referring to FIG. 6, there is shown a flowchart of signal processing performed in the pulse Doppler processing unit 6. In a step S1, output data S(r) supplied from the receiver 2 and temporarily stored in a buffer memory 54 are Fourier-transformed in the direction of range by an N-point FFT operator 52, the output of which is expressed in the following:

$$Sr(fr) = Fr[S(r)]$$

where Fr indicates a Fourier-transform in the direction of range and fr is a frequency.

In a step S2, a complex multiplier 51 multiplies the spectrum Rr(fr) of the reference signal stored in the reference memory 50 by the output data Sr(fr) of the N-point FFT operator 52, and the result Ur(fr) expressed in the following is temporarily stored in a buffer memory 55:

$$Ur(fr) = Sr(fr) \times Rr(fr)$$

In a step S3, an N-point IFFT operator 53 performs an inverse Fourier-transform on the data Ur(fr) output from the complex multiplier 51 and stored in the buffer memory 55. The output of the N-point IFFT operator U(r) is expressed as follows:

$$U(r) = Ffr^{-1}[Ur(fr)]$$

where $Ffr^{-1}$ indicates an inverse Fourier-transform in the direction of frequency.

In a step S4, the output data U(r) of the N-point IFFT operator 53 are stored in two-dimensional (2D) memory 61 with respect to a pulse hit p as data U(r,p), and an M-point FFT operator 62 performs an M-point Fourier-transform on the data U(r,p) in the direction of pulse hit before pulse Doppler processing is performed on the transformed data. The output of the M-point FFT operator 62 Up(r,fd) is expressed in the following:

$$Up(r,fd) = Fp[U(r,p)]$$

where Fp indicates a Fourier-transform in the direction of pulse hit and fd indicates a Doppler frequency.

The output of the M-point FFT operator 62 is envelope-detected by the amplitude detector 7 and a target is displayed on the display 8 by using a range-Doppler indication.

Figure 8:
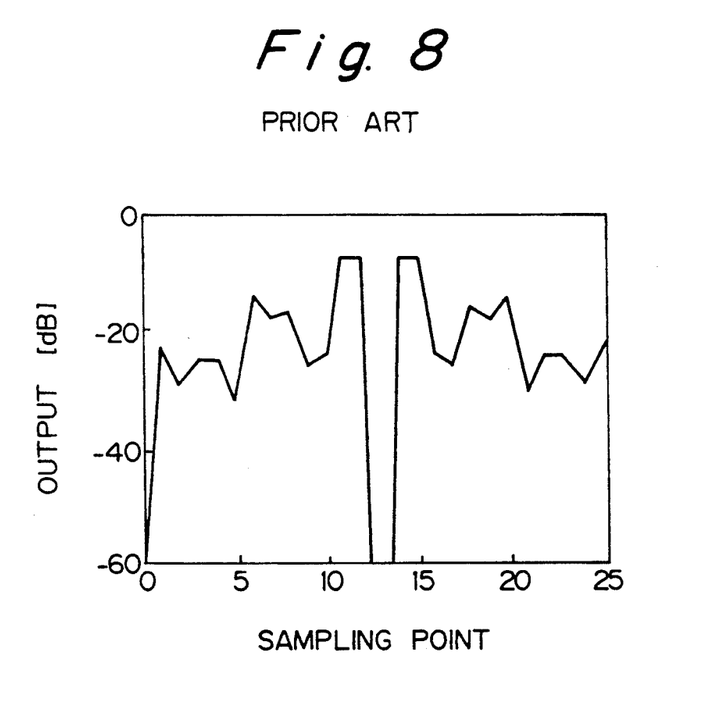
FIG. 8 shows an example of the waveform of a compressed pulse of the code modulation system of the prior art.

Next, a consideration will be made on the case where such a conventional pulsed Doppler radar system tracks a moving target which moves in a range-bin at a relative speed V resulting in a Doppler frequency fd. In the case of the chirp-type system, a pulse reflected by the moving target and received by the receiver has a time dependent frequency characteristic shown by a dotted line in FIG. 7. On the other hand, a pulse reflected by a target having a relative speed equal to zero has a time dependent frequency characteristics shown by a solid line in FIG. 7. Therefore, a frequency shift equal to the Doppler frequency fd between these characteristics can be seen. Since a delay-frequency characteristics of the pulse compressing unit of the conventional pulsed Doppler radar system is determined on the basis of the fact that a target moves at a relative speed equal to zero, a pulse reflected by that target has a shortened compressible range, and, as shown in FIG. 8, frequencies in a range only between an upper limit $f_1$ and a lower limit $f_2$ can be pulse-compressed. This leads to a loss equal to the output of the pulse compressing unit multiplied by ($\Delta td/T$). Further, the pulse compressing unit produces a delay $\Delta td = (T/\Delta f)fd$ which corresponds to a decrease in display range by a range bin equal to $\Delta td/\tau$.

In the case of the code modulation-type radar system, a frequency shift fd in a Doppler frequency rotates the phase of a received pulse, which produces a shift in phase characteristics of the pulse before being compressed and the reference signal. This results in an increase in level of a range side lobe and such drops in pulse compression performances as a reduction in pulse compression rate and a positional deviation or separation of compressed pulses. As a result, a range detection of a target moving at a high speed may erroneously be performed or become impossible. For example, in the case where a Barker code is used for a code sequence, if a non-compressed pulse having a pulse width T is subjected to the phase rotation of $2\pi$ due to the Doppler shift, an inconsistency in phase between the non-compressed pulse and the reference signal occurs. FIG. 8 shows an example of a pulse compressed waveform in the case of using a 13-bit Barker code. It can be said that the phase rotation of $2\pi$ taken place in a non-compressed pulse having a pulse width T is equal to $2\pi$, that is, $2\pi fd \cdot T = 2\pi$[rad]. By substituting $fd = 2V/\lambda$ ($\lambda$: a wavelenght of a transmitted signal) for fd in the above equation, $V = \lambda/2T$ can be obtained, which means that the pulse compression becomes impossible when $V = \lambda/2T$.

SUMMARY OF THE INVENTION

The present invention has been made to overcome the above-described problems. It is therefore an object of the invention to provide a pulsed Doppler radar system which has an improved performance of measurement in the range of a high-speed moving target and which enables pulse compression to be achieved without any Doppler shift influence.

According to one aspect of the present invention, a pulsed Doppler radar system comprises:

a transmitting means for generating and transmitting a pulse signal having an expanded frequency band;

an antenna means for sending the output of the transmitting means to a target and for receiving a signal which was sent by the transmitting means and reflected by the target;

a receiver means for processing the received signal to obtain a complex video signal;

a pulse compressing means including a pulse Doppler processing means responsive to the complex video signal for detecting a speed of the target relative to the radar system and a storage means for storing a reference signal which includes a compensation factor by which an influence of the Doppler effect is corrected in accordance with the speed of the target, the pulse compressing means operative to correlate the output of the pulse Doppler processing means with the reference signal so as to convert the complex video signal to a signal having a narrow frequency bandwidth;

a detecting means for performing envelope detection on the narrow bandwidth signal; and a display means responsive to the output of the detecting means for displaying a detected target thereon.

In accordance with another aspect of the present invention, a pulsed Doppler radar system comprising a transmitter for generating a transmission pulse signal and for modulating the transmission pulse signal to expand a frequency bandwidth of the pulse signal, an antenna apparatus for sending the output of the transmitter to a target and for receiving a signal which has been sent by the transmitter and reflected by the target, and a receiver for processing the received signal to obtain a complex video signal having a wide pulse width is characterized by a combination of:

a pulse compressing means including a pulse Doppler processing means responsive to the complex video signal for detecting a speed of the target relative to the radar system and a storage means for storing a reference signal which includes a compensation factor by which an influence of the Doppler effect is corrected in accordance with the speed of the target, the pulse compressing means being operative to corrleate the output of the pulse Doppler processing means with the reference signal so as to convert the complex video signal to a signal having a narrow frequency bandwidth;

a detector means for perform envelope detection on the output of the pulse compressing means; and a display means responsive to the output of the detector means for displaying a detected target thereon.

The pulse signal having the expanded frequency band may be a chirp pulse having an extended pulse width, and the reference signal may be a function of pulse width of the transmitted pulse, carrier frequency and pulse Doppler frequency shift.

The pulse signal having the expanded frequency band may be a coded phase-modulated pulse having an extended pulse width, and the reference signal may be a function of a pulse width of the transmitted pulse, carrier frequency and Doppler shift.

Consequently, in the case of the chirp system, although a moving target has a relative speed V which produces a Doppler frequency fd, the pulse signal is compressed using a reference signal having a time-frequency characteristic which shifts by the Doppler frequency fd in accordance with the relative speed of the target from a reference signal of the prior art where a relative speed of a target is assumed to be zero. It is therefore possible to compress the pulse signal over the entire frequency band of the received signal. In the case of the code modulation system, although a moving target has a relative speed V which produces a Doppler frequency fd, the pulse signal is compressed using, as a reference signal, a phase-coded pulse having additional phase shift of $2\pi fd \cdot T$ over a pulse width T in accordance with the relative speed of the target. It is therefore possible to compress the pulse signal without any influence of a phase error due to the Doppler shift.

The above and other objects and advantages of the present invention will become clearer from the following detailed description made in connection with the accompanying drawings.

DETAILED DESCRIPTION OF THE PREFERRED EMBODIMENTS

Figure 9:
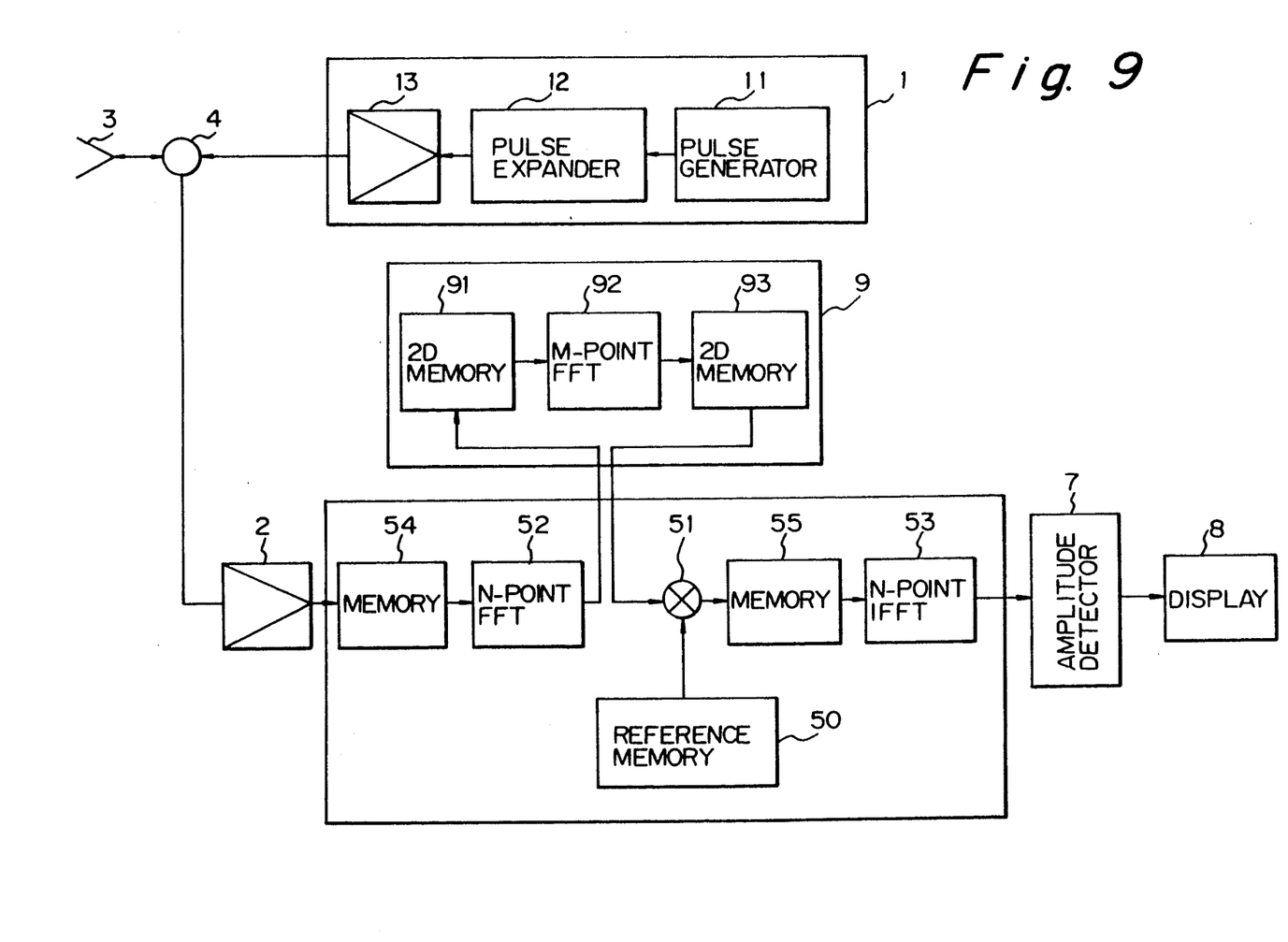
FIG. 9 is a block diagram showing the construction of an embodiment of a chirp-type pulsed Doppler radar system according to the present invention.
Figure 10:
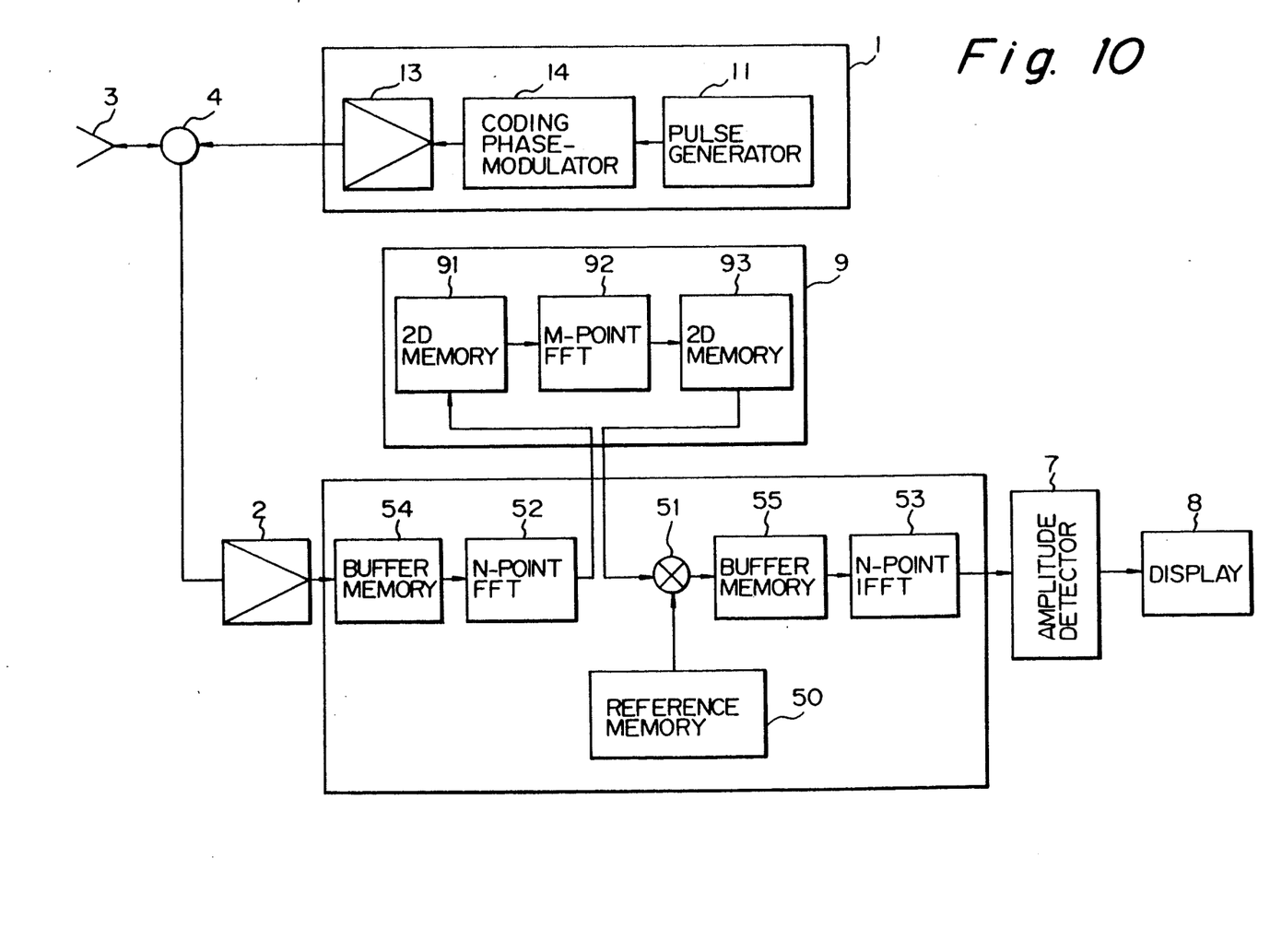
FIG. 10 is a block diagram showing the construction of an embodiment of a code modulation-type pulsed Doppler radar system according to the present invention.

FIGS. 9 and 10 are block diagrams showing the constructions of embodiments of a chirp-type and a code modulation-type pulsed Doppler radar systems, respectively, according to the present invention. The same reference numerals as used in FIGS. 1 and 2 designate similar or corresponding constitutional elements, and, therefore, explanations thereof are omitted hereinafter.

In constrast with the conventional pulsed Doppler radar systems as shown in FIGS. 1 and 2, the pulsed Doppler radar systems shown in FIGS. 9 and 10 according to the present invention comprise pulse Doppler processing units 9 which operates to detect a relative speed of a target and is included in the pulse compressing units 5 so as to be connected between the N-point FFT operators 52 and the complex multipliers 51. Since the chirp-type and code modulation-type pulsed Doppler radar systems have the same construction in the receiving sections, an explanation will hereinafter be made about the chirp-type pulsed Doppler radar system.

The pulse Doppler processing unit 9 comprises a two-dimensional memory 91 connected to the output of the N-point FFT operator 52, an M-point FFT operator 92 connected to the output of the two-dimensional memory 91 and a two-dimensional memory 93 connected between the M-point FFT operator 92 and the complex multiplier 51. The buffer memory 54 which stores the output of the receiver 2 is connected to the N-point FFT operator 52 which operates to perform an N-point Fourier-transform on the data read out of the buffer memory 54. The output of the N-point FFT operator 52 is stored in the two-dimensional memory 91. The data read out of the two-dimensional memory 91 is M-point Fourier-transformed by the M-point FFT operator 92 and stored in the two-dimensional memory 93.

An operation of the pulse compressing unit 5 including the pulse Doppler processing unit 9 will next be explained. A transmission pulse generated by the transmitter 1, as shown in FIG. 4a in the case of the chirp-type system and in FIG. 5a in the case of the code modulation-type system, is assumed to be expressed as TR(t). Then the reference signal, having a time-frequency characteristic which shifts by the Doppler frequency fd, is expressed as follows:

$$RFp(t,fd) = TR(T-t) \times exp[2\pi(fd-f_0)t] \quad (0 \leq t \leq T)$$

$$RFp(t,fd) = 0 \quad (T < t)$$

where T designates the width of the transmission pulse and $f_0$ designates a carrier frequency.

If an amplification characteristic for the received signal is given as w(t) shown in FIG. 4b, the reference signal is expressed in the following:

$$RFpw(t,fd) = RFp(t,fd) \times w(t)$$

Since a range-bin r is equal to t/ts where ts designates a sampling interval, the reference signal, a function of time, can be expressed as a function Rp(r,fd) of the range-bin r. By Fourier-transforming Rp(r,fd) in the direction of range, a spectrum Rrp(fr,fd) of the reference signal as expressed in the following can be obtained:

$$Rrp(fr,fd) = Fr[Rp(r,fd)]$$

where Fr indicates a Fourier-transform in the direction of range. The reference memory 50 prestores such a spectrum Rrp(fr,fd) of the reference signal. The spectrum Rrp(fr,fd) of the reference signal can be produced in a similar manner in both chirp-type and code modulation-type systems.

Figure 11:
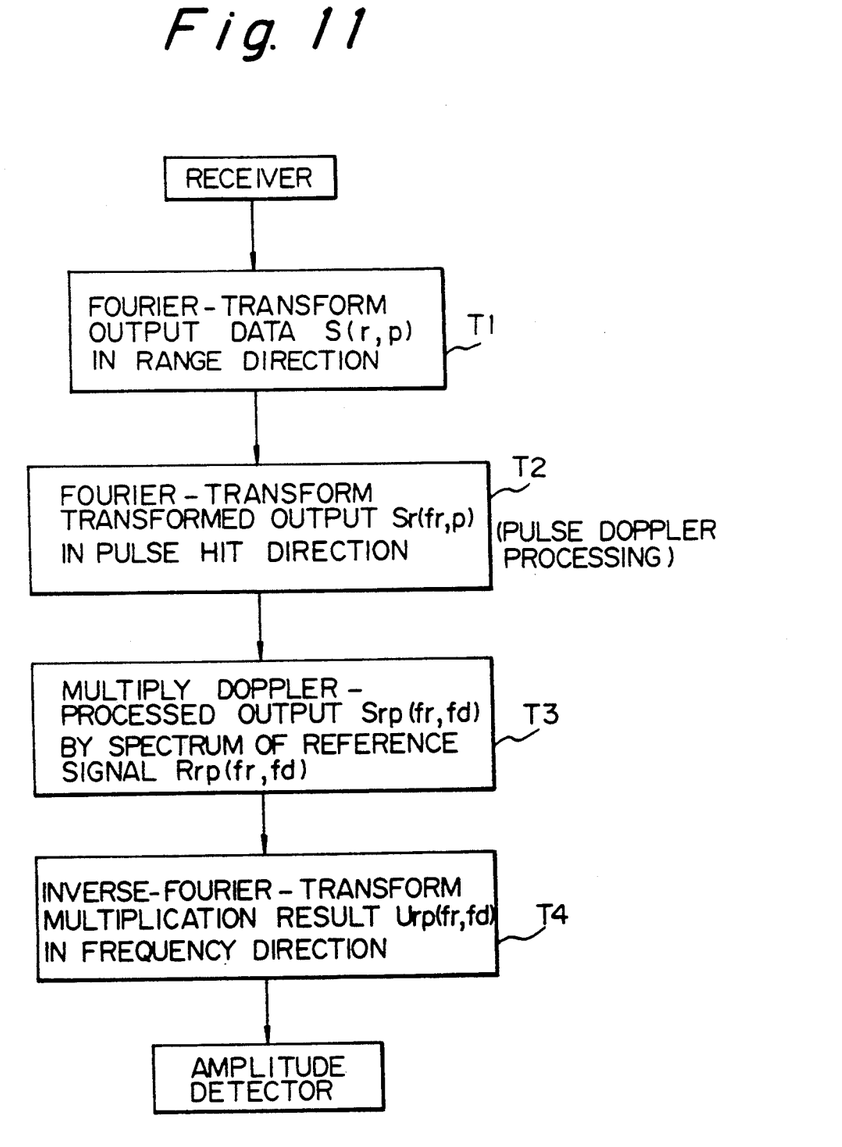
FIG. 11 shows a flowchart of signal processing in a pulse compressing unit and a pulse Doppler processing unit employed in the systems shown in FIGS. 9 and 10.

An operation of the pulse compressing unit 5 including the pulse Doppler processing unit 9 will next be explained with reference to FIG. 11 showing a flow of pulse Doppler processing and pulse compression.

In a step T1, data S(r,p) output from the receiver 2 and stored in the buffer memory 54 is Fourier-transformed in the direction of range by the N-point FFT operator 52. The output of the N-point FFT operator 52 is expressed in the following:

$$Sr(fr,p) = Fr[S(r,p)]$$

where Fr designates Fourier-transform in the direction of range and fr designates a frequency.

In a step T2, the output of the N-point FFT operator 52 is stored in the two-dimensional memory 91 on the basis of the frequency fr and the pulse hit p. The M-point FFT operator 92 reads the data Sr(fr,p) out of the two-dimensional memory 92, M-point-Fourier-transforms the read data in the direction of pulse hit and performs pulse Doppler processing on the transformed data. The output of the M-point FFT operator 92 is expressed in the following and stored in the two-directional memory 93:

$$Srp(fr,fd) = Fp[Sr(fr,p)]$$

where Fp designates a Fourier-transform in the direction of pulse hit and fd designates Doppler frequency.

In a step T3, the complex multiplier 51 multiplies Srp(fr,fd) stored in the two-dimensional memory 93 by the spectrum Rrp(fr,fd) stored in the reference memory 50 and obtained by Fourier-transforming the reference signal shift in frequency (or phase) of which due to Doppler shift has been corrected in accordance with a relative speed of a moving target. The output of the complex multiplier 51 expressed as follows is stored in the buffer memory 55:

$$Urp(fr,fd) = Srp(fr,fd) \times Rrp(fr,fd)$$

In a step T4, Urp(fr,fd) temporarily stored in the buffer memory 55 is inverse-Fourier-transformed in the direction of frequency by the N-point IFFT operator 53. The output of the N-point IFFT operator 53 is expressed in the following:

$$Ur(r,fd) = Ffr^{-1}[Urp(fr,fd)]$$

where $Ffr^{-1}$ designates an inverse Fourier-transform in the direction of frequency.

Next, the amplitude detector 7 effects amplitude detection on the output of the N-point IFFT operator 53 to cause a range bin-dependent Doppler frequency signal to be indicated on the display 8.

As described above, pulse compression can be made without any influence by Doppler shift using a reference signal obtained by compensating Doppler shift in frequency (or phase) of a conventional reference signal in accordance with a relative speed of a moving target. As a result, it is possible to improve a performance to detect a range of a target moving at a high speed.

The invention has been described in detail with reference to a certain preferred embodiment thereof, but it will be understood that variations and modifications can be effected within the spirit and scope of the invention. For example, the buffer memories 54 and 55 may be either one-dimensional or two-dimensional memories, and the buffer memories 54 and 55 may be replaced with a single memory. Also, the two-dimensional memories 91 and 93 may be replaced with a single memory.

What is claim is:

1. A pulsed Doppler radar system comprising:
   a transmitting means for generating and transmitting a pulse signal having an expanded frequency bandwidth;
   an antenna means for sending the output of said transmitting means to a target and for receiving a signal which was sent by said transmitting means and reflected by the target;
   a receiver means for processing the received signal to obtain a complex video signal;
   a pulse compressing means including a pulse Doppler processing means responsive to the complex video signal for detecting a speed of the target relative to said radar system and a storage means for storing a reference signal which includes a compensation factor by which an influence of the Doppler effect is compensated in accordance with the speed of the target, said pulse compressing means for combining the output of said pulse Doppler processing means with the reference signal so as to convert the complex video signal to a compressed signal having a narrow pulse width;
   a detecting means for performing envelope detection on the narrow pulse width signal; and
   a display means responsive to the output of said detecting means for displaying a detected target thereon.

2. A radar system as set forth in claim 1, wherein the pulse signal having the expanded frequency band is a chirp pulse having an extended pulse width, and wherein the reference signal is a function of a pulse width of the transmitted pulse, carrier frequency and Doppler shift.

3. A radar system as set forth in claim 1, wherein the pulse signal having the expanded frequency band is a phase-coded pulse having an extended pulse width, and wherein the reference signal is a function of pulse width of the transmitted pulse, carrier frequency and Doppler shift.

4. A radar system as set forth in claim 2, wherein said target has a relative speed V which produces a Doppler frequency fd, wherein the reference signal has a time-frequency characteristic which shifts by the Doppler frequency fd in accordance with the relative speed of the target.

5. A radar system as set forth in claim 3, wherein the target has a relative speed V which produces a Doppler frequency fd, and the reference signal is a phase-coded pulse having additional phase shift of two $2\pi f_d \cdot T$ over a pulse width T.

6. A pulsed doppler radar system comprising:
   a transmitting means for generating and transmitting a pulse signal having an expanded frequency bandwidth;
   an antenna means for sending the output of said transmitting means to a target and for receiving a signal which was sent by said transmitting means and reflected by the target;
   a receiver means for processing the received signal to obtain a complex video signal;

a pulse compressing means for providing a narrow pulse width signal;

a detecting means for performing envelope detection on the narrow pulse width signal;

a display means responsive to the output of said detecting means for displaying a detected target thereon;

said pulse compressing means including a pulse doppler processing means, an input means for receiving the complex video signal and coupling it to the pulse doppler processing means, said pulse doppler processing means for detecting a speed of the target relative to said radar system, a storage means for storing a reference signal which includes a compensation factor by which an influence of the doppler effect is compensated in accordance with the speed of the target, means for combining the output of said pulse doppler processing means with the reference signal from said storage means so as to convert the complex video signal to a compressed signal having a narrow pulse width, and output means for coupling the compressed signal to said detecting means.

7. A pulsed Doppler radar system comprising;

a transmitting means for generating and transmitting a pulse signal having an expanded frequency bandwidth;

an antenna means for sending the output of said transmitting means to a target and for receiving a signal which was sent by said transmitting means and reflected by the target;

a receiver means for processing the received signal to obtain a complex video signal;

a pulse compressing means for converting the complex video signal to a signal having a narrow pulse width;

a detecting means for perform envelope detection on the narrow pulse width signal; and a display means responsive to the output of said detecting means for displaying a detected target thereon;

wherein said pulse compressing means comprises:

a first memory receiving the complex video signal from said receiver means;

a first Fourier transfer means for processing the complex video signal;

a first two-dimensional memory receiving the output of said first Fourier transfer means;

a second Fourier transfer means operating on the content of said first two dimensional memory;

a second two-dimensional memory receiving the output of said second Fourier transfer means;

wherein said first two-dimensional memory, said second Fourier transfer means and said second two-dimensional memory provide pulsed operative processing for the output of said first Fourier transfer means;

storage means for storing a reference signal; and combining means for combining the output of said second two dimensional memory and the output of said storage means.

8. A method for processing a Doppler radar signal, comprising the steps of:

generating a pulse signal having an expanded frequency band with;

sending the pulse signal to a target;

receiving the pulse signal as reflected by the target;

processing the received signal to obtain a complex video signal;

Fourier-transforming the complex video signal in the range direction for the target to produce a transformed signal;

Fourier-transforming the transformed signal in the pulse hit direction of the received signal to produce a processed signal;

multiplying the processed signal by the spectrum of a reference signal to produce a product signal;

inverse Fourier-transforming the product signal; and performing envelope detection on the product of the inverse fourier-transforming step.

* * * * *